3,403,088
ELECTRODEPOSITION OF WATER-DISPERSED ACRYLIC INTERPOLYMERS
Donald P. Hart, Allison Park, Pa., assignor to PPG Industries, Inc., a corporation of Pennsylvania
No Drawing. Filed May 18, 1964, Ser. No. 368,394
8 Claims. (Cl. 204—181)

ABSTRACT OF THE DISCLOSURE

Water-dispersed coating compositions which can be applied by electrodeposition contain an at least partially neutralized acrylic interpolymer and an amine-aldehyde condensation product or a polyepoxide or both. The acrylic interpolymer is comprised of a hydroxyalkyl ester of an unsaturated carboxylic acid, an unsaturated carboxylic acid, and at least one other ethylenically unsaturated monomer. These compositions are easily and efficiently applied by electrodeposition and provide uniform, hard, adherent coatings having high dielectric strength, suitable as insulating coatings for metallic conductors.

---

This application relates to water-dispersed coating compositions which can be applied by electrodeposition, and to metallic articles insulated by a coating produced from such compositions.

Although electrodeposition of certain materials has been practiced to a certain extent heretofore, acceptance of such application methods has been hampered by a lack of coating compositions which can be satisfactorily applied in this manner. Most coating compositions which form desirable films and coatings when applied in conventional ways cannot be successfully applied using electrodeposition techniques. Moreover, electrodeposition of many coating materials, even when otherwise successful, is often subject to various disadvantages, such as non-uniform coatings, and by poor throwing power. By "throwing power" is meant that property whereby different areas of the electrode being coated receive substantially the same density of deposit.

It has now been found that certain water-dispersed coating compositions, comprising an acrylic interpolymer and an amine-aldehyde condensation product or a polyepoxide or both, provide coatings of highly desirable properties which can be satisfactorily applied by electrodeposition processes.

In addition to the characteristics necessary for any usable protective coating, such as film strength, adhesion, hardness, and the like, the compositions described herein provide coatings with certain unusual and desirable properties. For example, they have high dielectric strength and thus can be used to provide insulating coatings for metallic conductors employed in various electrical applications. Such applications require that the coating be uniform and be free from defects and other difficulties.

The compositions disclosed herein can be applied by electrodeposition processes for such purposes, because they coat metallic articles completely, including rough edges and corners, provide high throwing power and result in cured films which are clear, glossy, and have attractive appearance and good durability.

The compositions of the invention are water dispersions of a combination of several components. All or part of these components may be wholly or partly soluble in water, or they may be in the form of discrete particles dispersed in the water. The acrylic interpolymer, after neutralization as described below, is ordinarily water-soluble, at least to the extent of forming what is commonly known as a "soap solution" therein.

While the concentration of the coating components in the water is not critical within relatively wide limits, a substantial part of the composition is water, and the preferred compositions for use in electrodeposition contain from 65 percent to about 99 percent water; that is, the coating components form from about 1 percent to about 35 percent by weight of the over-all water dispersed composition. It iis desirable to use as low a concentration as will give satisfactory results, and thus, compositions with from about 1 percent to about 15 percent nonvolatile resin solids are typically used.

The coating components of the composition include an acrylic interpolymer which contains from about 1 percent to about 20 percent by weight of a hydroxyalkyl ester of acrylic acid, methacrylic acid, or other alpha, beta-ethylenically unsaturated carboxylic acid. These esters may be formed from an alkylene glycol esterified with the acid, or they can be produced by reaction of the acid with an alkylene oxide. Interpolymerized with the hydroxyalkyl ester is from about 1 percent to about 20 percent by weight of an unsaturated carboxylic acid, and at least one other ethylenically unsaturated monomer copolymerizable with the acid and the ester.

The preferred hydroxyalkyl esters in the acrylic interpolymer are esters of acrylic acid and methacrylic acid in which the hydroxyalkyl group has up to about 5 carbon atoms, such as 2-hydroxyethyl acrylate, 2-hydroxypropyl acrylate, 3 - hydroxypropyl acrylate, 2 - hydroxyethyl methacrylate, 2 - hydroxypropyl methacrylate, 3-hydroxypropyl methacrylate, 4 - hydroxybutyl methacrylate, and mixtures of such esters. Corresponding esters of other unsaturated acids, for example, ethacrylic acid, crotonic acid, and similar acids of up to about 6 carbon atoms, can also be employed.

In addition to esters of unsaturated monocarboxylic acids, there may be employed mono- or diesters of unsaturated dicarboxylic acids, such as maleic acid, fumaric acid, and itaconic acid, in which at least one of the esterifying groups contains a hydroxyl group. Such esters of unsaturated dicarboxylic acids provide specific characteristics in certain compositions. Examples of such esters include mono(2-hydroxyethyl)maleate,
mono(2-hydroxyethyl)fumarate,
bis(2-hydroxyethyl)maleate,
mono(2-hydroxypropyl)maleate,
bis(2-hydroxypropyl)maleate,
mono(2-hydroxyethyl)itaconate,
bis(2-hydroxyethyl)itaconate, and
2-hydroxyethylbutyl maleate.

The unsaturated acid monomer of the interpolymer is preferably acrylic acid or methacrylic acid, although other acids of up to about 6 carbon atoms, such as the unsaturated monocarboxylic acids and dicarboxylic acids described above in connection with the esters, can also be utilized. When a monoester of a dicarboxylic acid is utilized as the hydroxyalkyl monomer, it may also be considered as all or part of the acid monomer.

The remainder of the acrylic interpolymer is made up of one or more other ethylenically unsaturated monomers copolymerizable with the ester and acid. Any such monomer can be used; included among the monomers ordinarily utilized are various alkyl esters of alpha, beta-ethylenically unsaturated carboxylic acids, such as the alkyl acrylates and alkyl methacrylates, including the ethyl, methyl, propyl, butyl, hexyl, ethyl hexyl, and lauryl acrylates and methacrylates, as well as similar esters having up to about 20 carbon atoms in the alkyl group. A vinyl aromatic hydrocarbon may also be employed in the interpolymer, typical examples being styrene, alpha-alkyl styrene, and vinyl toluene.

Still other unsaturated monomers which can be used include various monoolefinic and diolefinic hydrocarbons, halogenated monoolefinic and diolefinic hydrocarbons, other unsaturated esters of organic and inorganic acids, unsaturated nitriles, unsaturated amides, other unsaturated acids, and the like. Some specific monomers which may be mentioned include ethylene, 1,3-butadiene, acrylonitrile, acrylamide, vinyl acetate, alpha-chlorostyrene, vinyl chloride, methyl crotonate, allyl chloride, and similar compounds.

These interpolymers are produced using conditions and catalysts conventionally employed in making acrylic polymers. For example, a free radical catalyst is usually present and the polymerization temperatures is generally between about 65° and 140° C.

The acrylic interpolymer should be at least partially neutralized; that is, all or part of the acidic carboxyl groups in the interpolymer should be neutralized in order to obtain the properties desirable in electrodeposition processes. Ordinarily, at least about 10 percent of the acidic groups are neutralized. This is accomplished by reaction of these groups with a base, and can be carried out either before or after the incorporation of the interpolymer in the coating composition.

Various bases can be employed for this neutralization, and it is preferred that a substantial proportion, for example, about 50 percent or more, of the acidic groups be neutralized. Inorganic bases, such as metal hydroxides, can be used, as can organic bases such as ammonia or other amines. The particular base employed and the extent of neutralization depends in part upon the nature of the monomers in the interpolymer and the components of the coating composition. When a polyepoxide is included in the composition, it is generally preferred to utilize an inorganic base, such as sodium hydroxide or other alkali metal or alkaline earth metal hydroxide, or if an amine is used, to employ a tertiary amine, such as triethylamine or tributylamine.

In other cases, ammonia is often utilized, as are primary and secondary amines. Among the amines which may be used are alkylamines, such as ethylamine, propylamine, dimethylamine, dibutylamine, cyclohexylamine, diisoamylamine, and tripropylamine; unsaturated amines, such as allylamine; arylamines, such as aniline; aralkylamines, such as benzylamine; alkarylamines, such as m-toluidine; cyclic amines, such as morpholine and piperidine; diamines, such as hydrazine, ethylene diamine, and piperazine; and substituted amines, such as triethanolamine. In some cases, part of the neutralization is carried out with a diamine and part with another base, or part of the neutralization can be effected with amines such as the amino-alkyl-alkanediols, for example, 2-methyl-2-amino-1,3-propanediol.

The neutralization reaction is accomplished by mixing the neutralizing base with the interpolymer or the water-dispersed composition. A water solution or other solution of the base may be utilized, and, if desired, moderately elevated temperatures may be employed.

Along with the acrylic interpolymer, which forms from about 95 percent to about 50 percent by weight of the coating components of the water-dispersed composition, the nonvolatile portion of the composition includes from about 5 percent to about 50 percent by weight of an amine-aldehyde condensation product, a polyepoxide, or a combination of these.

The amine-aldehyde products employed herein are aldehyde condensation products of melamine, urea, acetoguanamine, or a similar compound. They may be water-soluble or they may be organic solvent-soluble. Generally, the aldehyde employed is formaldehyde, although useful products can be made from other aldehydes, such as acetaldehyde, crotonaldehyde, acrolein, benzaldehyde, furfural, and others. Condensation products of melamine or urea are the most common and are preferred, but products of other amines and amides in which at least one amino group is present can also be employed.

For example, such condensation products can be produced from triazines, diazines, triazoles, guanidines, guanamines, and alkyl and aryl-substituted derivatives of such compounds, including alkyl-substituted, aryl-substituted and cyclic ureas, and alkyl and aryl-substituted melamines. Some examples of such compounds are N,N'-dimethyl urea, benzyl urea, N,N'-ethylene urea, diazine diamide, formaguanamine, benzoguanamine, ammeline, 2-chloro-4,6-diamino-1,3,5-triazine, 3,5-diaminotriazole, 4,6-diaminopyrrimidine, 2,4,6-triphenyltriamino-1,3,5-triazine, and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially any monohydric alcohol, although the preferred alcohols are methanol, butanol, and similar lower alkanols.

The amine-aldehyde condensation products are produced in a manner well known in the art, using acidic or basic catalysts and varying conditions of time and temperature. The aldehyde is often employed as a solution in water or alcohol, and the condensation, polymerization and etherification reactions may be carried out either sequentially or simultaneously.

In place of or in addition to the amine-aldehyde condensation product, there may be employed a polyepoxide. The polyepoxide can be any epoxide compound or mixture which has an epoxy functionality of greater than 1.0, that is, in which the average number of oxirane groups

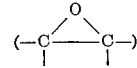

per molecule is greater than 1. The average number of oxirane groups may be a fractional number, and in general is less than 4.0. These polyepoxides comprise a relatively large class of materials and have been described in numerous patents, such as United States Patents Nos. 2,467,171; 2,615,007; 2,716,123; 3,030,336; 3,053,855; and 3,075,999.

Among the polyepoxides which can be used herein are the polyglycidyl ethers of polyphenols, such as bis-phenol A. These may be obtained, for example, by etherification of a polyphenol with epichlorohydrin or dichlorohydrin in the presence of an alkali. The phenolic compound may be bis(4-hydroxy-phenyl)2,2-propane, 4,4'-dihydrobenzophenone, bis(4-hydroxy-phenyl)1,1 - ethane, bis(4 - hydroxy-phenyl)1,1-isobutane, bis(4-hydroxy-phenyl)2,2-propane, bis(4 - hydroxy-tertiary-butyl phenyl)2,2 - propane, bis(2-hydroxy-naphthyl)-methane, 1,5 - dihydroxy-naphthalene, or the like. The polyphenol can also be a novolak resin or a similar polyphenol resin.

Such polyglycidyl ethers of polyphenols correspond to the average formula:

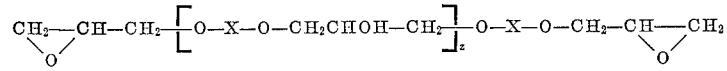

in which X represents an aromatic radical, and z represents a whole or fractional small number.

Also suitable are the similar polyglycidyl ethers of polyhydric alcohols which may be derived from such aliphatic polyhydric alcohols as ethylene glycol, diethylene glycol, triethylene glycol, 1,2-propylene glycol, 1,4-butylene glycol, 1,5-pentanediol, 2,4,6-hexanetriol, glycerol, and the like. Such polyepoxides provide water-dispersed, neutralized compositions of better stability, and thus are preferred in certain instances.

There may also be employed the polyglycidyl esters of polycarboxylic acids, which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, terephthalic acid, 2,6-naphthylene dicarboxylic acid, dimerized linolenic acid, and the like. Examples are diglycidyl adipate and diglycidyl phthalate, and similar esters which correspond to the formula:

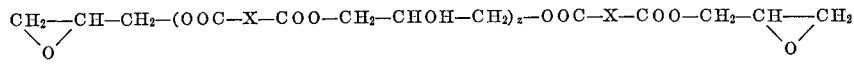

in which X represents a hydrocarbon radical, such as a phenyl or other aromatic radical or an aliphatic radical, and $z$ represents a whole or fractional small number.

There may also be employed polyepoxides derived from the epoxidation of an olefinically unsaturated alicyclic compound. Included are diepoxides and higher epoxides, as well as mixtures of epoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid.

Among the polyepoxides derived from the epoxidation of alicyclic compounds are those of the formula:

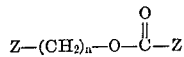

where $n$ is a small whole number, e.g., from 1 to 8, and Z is a radical of the structure:

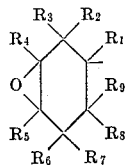

where $R_1$ through $R_9$ are hydrogen or lower alkyl radicals, i.e., having up to about 8 carbon atoms. Examples of these polyepoxides are described in United States Patent No. 2,716,123.

There may also be employed the corresponding diesters of the formula:

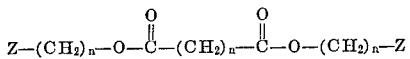

where $n$ and Z are as above. Products of this type may be produced, for example, by reducing the cyclic unsaturated aldehyde from the Diels-Alder reaction of crotonaldehyde and butadiene (or similar reactants) to the corresponding alcohol and reacting 2 moles of this alcohol with 1 mole of sebacic acid or a similar dicarboxylic acid.

Other polyepoxides from the epoxidation of olefinically unsaturated alicyclic compounds are those of the formula:

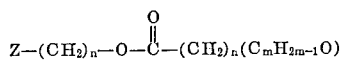

where Z and $n$ are as above and the group $(C_mH_{2m-1}O)$ is an epoxyalkyl group, preferably having from 8 to 16 carbon atoms. These compounds may be produced by the epoxidation of a 3-cyclohexenylalkyl ester of a mono-unsaturated fatty acid, for example, with peracetic acid. Examples of these compounds are disclosed in United States Patent No. 2,786,066.

Higher epoxides are produced from the similar reaction of 3-cyclohexenylalkyl esters of polyunsaturated fatty acids, and these can also be employed in the invention. These include, for example, the polyepoxides of United States Patent No. 2,786,067 and others having the formula:

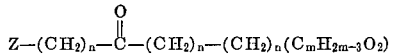

where Z and $n$ are as above and $(C_mH_{2m-3}O_2)$ is a diepoxy-alkyl radical.

Still other polyepoxides from the epoxidation of olefinically unsaturated alicyclic compounds that may be employed are the epoxy-alicyclic ethers which correspond to the above-described epoxy-alicyclic esters. For example, these have the formula:

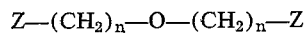

where Z and $n$ are as above.

In formulating the coating composition, ordinary tap water may usually be employed. However, such water may sometimes contain a relatively high level of cations which, while not ordinarily rendering the process inoperative, can cause variations in certain properties of the composition when it is used in electrodeposition. This can be overcome by the use of distilled water or deionized water from which free ions have been removed, as by passage through an ion exchange resin.

While the compositions described herein can be applied in any conventional manner, for example, by brushing, spraying or roll coating, they are especially adapted for use in electrodeposition. In electrodeposition processes utilizing these water-dispersed coating compositions, the coating composition is placed in contact with an electrically conductive metal anode and an electrically conductive cathode. The metal substrate to be coated is used as the anode and may be of any electrically conductive metal, such as iron, steel, aluminum, galvanized steel, phosphatized steel, zinc, copper, and the like. Upon the passage of electric current between the anode and the cathode while in contact with the water-dispersed composition, an adherent film of the coating composition is deposited on the anode. Either direct current or, with suitable equipment, alternating current can be used.

The conditions at which the electrodeposition is carried out can be those conventionally used in electrodeposition methods employed heretofore. The applied voltage can be varied greatly and can be very low, e.g., 1 volt, or very high, e.g., 1000 volts or even higher. It is typically between about 50 volts and about 350 volts. The initial current density is usually between about 0.1 ampere per square foot and about 15 amperes per square foot, and generally decreases somewhat during electrodeposition of a film.

It is desirable to maintain a relatively low pH of the water-dispersed composition. It is preferable that the pH be under about 10.0, but this depends upon the particular components of both the acrylic interpolymer and the other resinous materials, as well as the extent of the neutralization.

The coating composition described herein can be applied to various substrates to provide protective coatings for different uses. However, because of their particular properties, they are especially valuable for use as one-coat insulating films for electrically conductive metal articles. Their uniformity, high dielectric strength, and durability all contribute to their utility in this regard. Moreover, their application by electrodeposition provides complete coverage of the surface to be coated, including rough edges, corners, and the like, a factor which is particularly important in an insulating coating.

Many of these coating compositions are also characterized by their adhesion to certain materials which are ordinarily difficult to provide with adherent coatings. For example, the soft aluminum known in the art as aluminum magnet strip is usually difficult to coat satisfactorily, but the compositions described herein, particularly when applied by electrodeposition techniques, provide satisfactory coatings thereon. Because of this combination of properties, these materials are particularly adapted to the manufacture of electrically insulated aluminum strips useful for carrying current in certain applications.

The compositions herein after application are ordinarily cured by baking the coated article for 1 to 30 minutes at 250° F. to 800° F.

Set forth below are several examples of the water-dispersed coating compositions of the invention. These examples are illustrative and are not to be construed as limiting the invention. All parts and percentages are by weight unless otherwise specified.

EXAMPLE 1

A reaction vessel was charged with 400 parts of butyl Cellosolve (ethylene glycol monobutyl ether) and 100 parts of 2-butanol, and heated to reflux (about 130° C.). The following monomers were mixed with 10 parts of benzoyl peroxide and the mixture was added slowly over a 3½ hour period:

| | Parts by weight |
|---|---|
| Methyl methacrylate | 290 |
| Ethyl acrylate | 230 |
| Butyl methacrylate | 320 |
| 2-hydroxypropyl acrylate | 100 |
| Methacrylic acid | 60 |

When the addition was complete, an additional 1 part of benzoyl peroxide in 10 parts of butyl Carbitol (diethylene glycol monobutyl ether) was added and heating contined for 2 hours. The product had a nonvolatile solids content of 66.6 percent, an acid value of 26.72, and a Gardner-Holdt viscosity of $Z_6$–$Z_7$.

There were mixed 609 parts of the above resin composition (406 parts resin solids), 754 parts of deionized water, and 20 parts of diethylamine to produce a partially neutralized interpolymer solution (30 percent solids). To 952 parts of this solution there were added with agitation 143 parts of hexakis(methoxymethyl)melamine (Cymel 300), 121 parts of deionized water, and 51 parts of diethylamine. The product had a solids content of 35 percent and a pH of 9.0. Additional water was added to reduce the solids content to 10 percent.

EXAMPLE 2

An interpolymer was produced from the monomers set forth below. The procedure followed that of Example 1, except that the temperature was about 105° C. and heating was continued for 6 hours after the monomer addition was complete, with additional 2.5-part portions of benzoyl peroxide in 25 parts of butyl Carbitol being added after each of the first four hours. The initial solvent charge was 1000 parts of butyl Cellosolve and 250 parts of 2-butanol; 25 parts of benzoyl peroxide were included with the monomers.

| | Parts by weight |
|---|---|
| Acrylonitrile | 750 |
| Ethyl acrylate | 575 |
| Butyl methacrylate | 400 |
| Methyl methacrylate | 375 |
| 2-hydroxypropyl methacrylate | 250 |
| Methacrylic acid | 150 |

The product had a resin solids content of 67.6 percent, an acid value of 26.8, and a Gardner-Holdt viscosity of $Z_{10+}$. Thirteen hundred (1300) parts of this product were mixed with 833 parts of deionized water and 44 parts of diethylamine. This partially neutralized product was mixed with 40 percent by weight, based on the total solids content of the mixture, of a butylated melamine-formaldehyde resin made from 1 mole of melamine, 6 moles of formaldehyde, and 4.73 moles of butanol. Sufficient water and diethylamine were added to make the total solids content 10 percent and the pH 8.5.

EXAMPLE 3

Example 2 was repeated, with an interpolymer produced from the following monomers:

| | Parts by weight |
|---|---|
| Methyl methacrylate | 725 |
| Ethyl acrylate | 575 |
| Butyl methacrylate | 800 |
| 2-hydroxypropyl methacrylate | 250 |
| Methacrylic acid | 150 |

The interpolymerization product had a resin solids content of 66 percent, an acid value of 37.7 and a Gardner-Holdt viscosity of $Z_7$–$Z_8$. Partial neutralization was carried out by mixing 1300 parts of this product with 833 parts of deionized water and 37.5 parts of diethylamine. The final composition had a solids content of 10 percent, a pH of 8.4 and a melamine-formaldehyde resin content of 40 percent, based on the total solids content.

EXAMPLE 4

Example 2 was repeated, using an interpolymer of the following monomers:

| | Parts by weight |
|---|---|
| Methyl methacrylate | 840 |
| 2-hydroxypropyl methacrylate | 100 |
| Methacrylic acid | 6 |

The final composition had a solids content of 10 percent and a pH of 8.2.

EXAMPLE 5

A reaction vessel containing 665 parts of deionized water and 1 part of ammonium persulfate was heated to 90° C. Over a period of about 2 hours there was added to the vessel a solution of 4 parts of ammonium persulfate in 500 parts of deionized water, along with a mixture of the following:

| | Parts by weight |
|---|---|
| Ethyl acrylate | 125 |
| Methyl methacrylate | 150 |
| Acrylonitrile | 150 |
| 2-hydroxypropyl methacrylate | 50 |
| Methacrylic acid | 25 |
| Tertiary-dodecyl mercaptan | 15 |

After heating an additional 1½ hours, the mixture was cooled and sufficient deionized water and diethylamine were added to make the total solids content 25.5 percent and the pH 7.2. Nine hundred thirty-six (936) parts of this product were thoroughly mixed with 102 parts of hexakis(methoxymethyl)melamine and then there were added slowly with agitation 2368 parts of deionized water and sufficient diethylamine to make the pH 8.5.

EXAMPLE 6

In this example, the partially neutralized interpolymer solution of Example 1 was utilized. There were added to 866.6 parts of this solution (30 percent solids) 65 parts of a polyepoxide made from epichlorohydrin and bisphenol A, and having an epoxide equivalent of 175 to 210 and a molecular weight of 350 to 400 (Epon 828). To this mixture were added 2318 parts of deionized water and sufficient diethylamine to make the pH 9.3.

EXAMPLE 7

In this example, there was employed an interpolymer (made in a manner similar to the above) produced from the following monomers:

| | Parts by weight |
|---|---|
| Acrylonitrile | 118.7 |
| Ethyl acrylate | 91.0 |
| Butyl methacrylate | 64.0 |
| Methyl methacrylate | 59.4 |
| 2-hydroxypropyl methacrylate | 39.6 |
| Methacrylic acid | 24.3 |

The resinous product had a solids content of 59.7 percent in a solvent blend of 2 parts of ethylene glycol monoethyl ether to 1 part of diacetone alcohol. To 457 parts of this resin solution there was added a solution of 20 parts of triethanolamine in 500 parts of deionized water; sufficient additional triethanolamine was added to make the pH 7.5 to 7.6. This mixture was blended with 68 parts of the polyepoxide employed in Example 6 (Epon 828) and sufficient water was added slowly to make the total solids content 10 percent.

EXAMPLE 8

To 384 parts of the unneutralized interpolymer of Example 7 (60 percent solids) there were added 58 parts of epoxidized polybutadiene having an epoxide equivalent of 177, hydroxyl content of 2.5 percent, and iodine number of 185 (Oxiron 2000). Neutralization was effected by mixing in 11 parts of triethylamine, after which 3147 parts of deionized water were slowly added to make the solids content 8 percent. The pH was 7.7.

EXAMPLE 9

Example 7 was repeated, except that 3,4-epoxy-6-methylcyclohexylmethyl - 3,4-epoxy-6-methylcyclohexanecarboxylate (Unox Epoxide 201) was employed as the polyepoxide and was added prior to the addition of any of the triethanolamine, and a 2 percent aqueous triethanolamine solution was used to adjust the pH to 8.5.

EXAMPLE 10

The interpolymer of Example 2 was produced, except that the only solvent was butyl Cellosolve and the neutralization was carried out to a pH of 8.0. There were mixed together 634 parts of the partially neutralized interpolymer solution (28.4 percent solids) and 120 parts of hexakis-(methoxymethyl)melamine. To this mixture were added with agitation 80 parts of the polyepoxide employed in Example 6 and 2000 parts of deionized water. Sufficient additional water and diethylamine were then added to make the solids content 10 percent and the pH 8.5.

EXAMPLE 11

The partially neutralized interpolymer of Example 2 was mixed with 40 percent by weight (based on the total solids of the mixture) of hexakis(methoxymethyl)melamine. To 604 parts of this mixture there were added 80 parts of the epoxide utilized in Example 9 and 3316 parts of deionized water. Sufficient diethylamine was added to make the pH 8.4.

EXAMPLE 12

An interpolymer was produced as in Example 10, but no neutralization was carried out. This interpolymer (about 60 percent solids) was mixed with 20 percent by weight, based on the total solids content of the mixture, of the polyepoxide employed in Example 6. To 539 parts of this mixture there were then added 500 parts of a 2 percent triethylamine solution in deionized water and sufficient additional water to make the solids content 10 percent. The pH was 8.5.

EXAMPLE 13

Example 12 was repeated, except that to 525 parts of the interpolymer-polyepoxide mixture there were added 125 parts of a 2 percent solution of dimethylethanolamine. Additional water and amine were added to make the solids content 10 percent and the pH 8.0.

EXAMPLE 14

Example 12 was repeated, except that 750 parts of a 2 percent diethylamine solution was used in place of the triethylamine solution. The pH was 8.4.

EXAMPLE 15

Example 12 was repeated, except that to 525 parts of the interpolymer-polyepoxide mixture there were added 135 parts of a 3 percent potassium hydroxide solution. Sufficient additional deionized water and potassium hydroxide were added to make the pH 8.3 and the total solids content 10 percent.

EXAMPLE 16

An interpolymer-polyepoxide mixture as in Example 12 was neutralized with 5 percent sodium hydroxide, added along with deionized water, to a pH of 9.0 and a solids content of 10 percent.

EXAMPLE 17

To 457 parts of the unneutralized interpolymer described in Example 7 there were added 14 parts of triethylamine and 100 parts of deionized water. This was blended with 68 parts of the diglycidyl ether of 1,4-butanediol and sufficient water was added to make the solids content 8 percent. The pH was 8.8.

Other compositions are produced similarly with various monomers, amine-aldehyde condensation products and polyepoxides. For example, other hydroxyalkyl esters, such as hydroxyethyl acrylate, hydroxyethyl maleate, or butyl hydroxyethyl maleate, can be substituted for the hydroxyalkyl monomer of the interpolymers described, as can mixtures of hydroxyalkyl esters, such as a 1 to 1 molar ratio of hydroxyethyl methacrylate and hydroxypropyl methacrylate. Also, various amine-aldehyde products, such as butylated melamine-formaldehyde resins and urea-formaldehyde resins, and polyepoxides, such as that known as Epi-Rez 510 (epoxide equivalent 180 to 200, molecular weight 350 to 400), can be employed in place of the corresponding materials of the examples.

An indicated above, the preferred use of the coating compositions described herein is for electrodeposition of coatings on electrically conductive metal substrates, such as aluminum, steel and copper. The following examples illustrate this embodiment of the invention.

EXAMPLES 18 TO 35

In carrying out each of these examples, the coating

TABLE I

| Example No. | Composition as in Example No. | Substrate | Concentration (percent) | Bath pH | Applied EMF (volts) | Current (amperes) | Deposition Time (seconds) | Baking Temp. °F. | Baking Time (minutes) | Film Thickness (mils) |
|---|---|---|---|---|---|---|---|---|---|---|
| 18 | 1 | Aluminum | 10 | 9.0 | 140 | 1.25–0.4 | 60 | 350 | 20 | 0.6–0.8 |
| 19 | 1 | Copper | 10 | 9.0 | 100 | 0.8–0.01 | 90 | 350 | 10 | 0.7 |
| 20 | 2 | Aluminum | 10 | 8.5 | 240 | 1.45–0.23 | 90 | 350 | 20 | 1 |
| 21 | 3 | do | 10 | 8.4 | 100 | 0.4–0.23 | 90 | 350 | 20 | 1 |
| 22 | 4 | Steel | 10 | 8.2 | 150 | 1.2–0.31 | 60 | 350 | 20 | 0.5–0.6 |
| 23 | 5 | Aluminum | 10 | 8.5 | 50–70 | 1.25–0.35 | 60 | 350 | 20 | |
| 24 | 6 | do | 10 | 9.3 | 130 | 1.15–0.25 | 90 | 500 | 5 | 0.8–0.9 |
| 25 | 7 | do | 10 | 7.5–7.6 | 175 | 0.8–0.4 | 90 | 500 | 0.5 | 0.5–0.6 |
| 26 | 8 | do | 8 | 7.7 | 65 | 0.5–0.02 | 90 | 500 | 2 | 1 |
| 27 | 9 | do | 10 | 8.5 | 100 | 1.0–0.05 | 90 | 500 | 1 | 0.5–0.6 |
| 28 | 10 | do | 10 | 8.5 | 275 | 1.24–0.18 | 60 | 400 | 15 | 0.7 |
| 29 | 11 | do | 9 | 8.4 | 150 | 0.83–0.09 | 90 | 500 | 5 | 1 |
| 30 | 12 | do | 10 | 8.5 | 200 | 1.2–0.15 | 90 | 500 | 1 | 0.9 |
| 31 | 13 | do | 10 | 8.0 | 225 | 0.48–0.10 | 90 | 500 | 1 | 0.7–0.8 |
| 32 | 14 | do | 10 | 8.4 | 140 | 0.57–0.18 | 90 | 500 | 1 | 1.0 |
| 33 | 15 | do | 10 | 8.3 | 50–75 | 0.62–0.01 | 30 | 500 | 1 | 0.4–0.5 |
| 34 | 16 | do | 10 | 9.0 | 200 | 0.48–0.2 | 90 | 350 | 20 | 0.9–1.0 |
| 35 | 17 | do | 10 | 8.8 | 150 | 0.60–0.17 | 60 | 500 | 2 | 0.5 | composition was placed in a 1-gallon polyethylene container with provision for agitation. Two electrodes spaced 2 inches apart were employed, the desired substrate being the anode and the cathode being steel or aluminum. The electromotive force was applied between the electrodes from a 0–1000 volt industrial rectifier. The coatings were cured by baking. The aluminum employed was soft aluminum magnet strip, 12 mils thick, in panels 2½ inches by 6 inches. The steel panels were phosphatized steel (Bonderite 37), 4 inches by 12 inches, and the copper was 0.045 inch diameter wire. Table I above sets forth the data from these tests.

All the coatings produced were adherent and generally attained a high level of desirable properties. In some cases, the coatings were further tested by immersing them in a boiling mixture of equal parts of ethanol and toluene. While the resistance to this test varied, several of the above coatings, particularly those of Example 7, 8 and 16, were outstanding in this regard. Illustrating the insulating properties of these coatings were tests which indicated that their dielectric strength is in excess of 1000 volts (DC).

Other properties which make metal articles coated with the products of this invention especially useful include their excellent flexibility, durability, and the like.

According to the provisions of the patent statutes, there are described above the invention and what are now considered to be its best embodiments. However, within the scope of the appended claims, it is to be understood that the invention can be practiced otherwise than as specifically described.

I claim:
1. A method of coating a metal substrate which comprises passing electric current between an electrically conductive metal anode and an electrically conductive cathode in contact with a water-dispersed coating composition comprising:
    (a) from about 95 percent to 50 percent by weight, based on the total of (a) and (b) herein, of an at least partially neutralized interpolymer of from about 1 percent to about 20 percent by weight of a hydroxalkyl ester of an alpha, beta-ethylenically unsaturated carboxylic acid, from about 1 percent to about 20 percent by weight of an unsaturated carboxylic acid, and at least one other copolymerizable ethylenically unsaturated monomer; and
    (b) from about 5 percent to about 50 percent by weight of at least one member of the group consisting of an amine-aldehyde condensation product and a polyepoxide,
whereby there is deposited an adherent film of said coating composition on said anode.
2. The method of claim 1 in which said member is an amine-aldehyde condensation product.
3. The method of claim 1 in which said member is a polyepoxide.
4. The method of claim 1 in which both an amine-aldehyde condensation product and a polyepoxide are present.
5. A method of coating a metal substrate which comprises passing electric current between an electrically conductive metal anode and an electrically conductive cathode in contact with a water-dispersed coating composition comprising:
    (a) from about 95 percent to about 50 percent by weight, based on the total of (a) and (b) herein, of an at least partially neutralized interpolymer of from about 1 percent to about 20 percent by weight of hydroxyalkyl ester of an alpha, beta-ethylenically unsaturated carboxylic acid of up to about 6 carbon atoms, said ester having from about 2 to about 5 carbon atoms in the hydroxyalkyl group; from about 1 percent to about 20 percent by weight of an unsaturated carboxylic acid of up to about 6 carbon atoms; and at least one other copolymerizable ethylenically unsaturated monomer; and
    (b) from about 5 percent to about 50 percent by weight of a condensation product of formaldehyde and a member of the group consisting of melamine, urea, guanamine, and substituted derivates thereof,
whereby there is deposited an adherent film of said coating composition on said anode.
6. The method of claim 5 in which said ester is a hydroxyalkyl ester of an acid of 3 to 4 carbon atoms, said ester having 2 to 3 carbon atoms in the hydroxyalkyl group, and said condensation product is a melamine-formaldehyde condensation product.
7. A method of coating a metal substrate which comprises passing electric current between an electrically conductive metal anode and an electrically conductive cathode in contact with a water-dispersed coating composition comprising:
    (a) from about 95 percent to about 50 percent by weight, based on the total of (a) and (b) herein, of an at least partially neutralized interpolymer of from about 1 percent to about 20 percent by weight of a hydroxyalkyl ester of an alpha, beta-ethylenically unsaturated carboxylic acid of up to about 6 carbon atoms, said ester having from about 2 to about 5 carbon atoms in the hydroxyalkyl group; from about 1 percent to about 20 percent by weight of an unsaturated carboxylic acid of up to about 6 carbon atoms; and at least one other copolymerizable ethylenically unsaturated monomer; and
    (b) from about 5 percent to about 50 percent by weight of a polyepoxide having an epoxy functionality of greater than 1,
whereby there is deposited an adherent film of said coating composition on said anode.
8. The method of claim 7 in which said polyepoxide is a polyglycidyl ether of a polyhydric alcohol.

References Cited
UNITED STATES PATENTS

| | | | |
|---|---|---|---|
| 2,530,366 | 11/1950 | Gray | 204—181 |
| 2,787,603 | 4/1957 | Sanders | 260—29.4 |
| 2,895,930 | 7/1959 | Yusem | 260—29.4 |
| 2,918,391 | 12/1959 | Hornibrook | 260—29.4 |
| 2,952,564 | 9/1960 | Traverso | 260—29.4 |
| 2,991,260 | 7/1961 | Auer et al. | 260—29.4 |
| 3,107,227 | 10/1963 | Suen et al. | 260—29.4 |
| 3,200,057 | 10/1965 | Burnside et al. | 204—181 |
| 3,230,162 | 1/1966 | Gilchrist | 204—181 |

JOHN H. MACK, *Primary Examiner.*

E. ZAGARELLA, *Assistant Examiner.*